(12) United States Patent
Zhou et al.

(10) Patent No.: US 6,508,910 B2
(45) Date of Patent: *Jan. 21, 2003

(54) SELF-ADHESIVE PREPREG FACE SHEET FOR SANDWICH PANELS

(75) Inventors: Ligui Zhou, Dublin, CA (US); Philippe D. Christou, St. Clair de la Tour (FR)

(73) Assignee: Hexcel Corporation, Dublin, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 09/795,177

(22) Filed: Feb. 27, 2001

(65) Prior Publication Data

US 2001/0042593 A1 Nov. 22, 2001

Related U.S. Application Data

(63) Continuation-in-part of application No. 09/573,760, filed on May 18, 2000, now Pat. No. 6,440,257.

(51) Int. Cl.[7] .................................................. C09J 5/02
(52) U.S. Cl. ...................... 156/307.3; 156/313; 442/181; 523/435; 523/440
(58) Field of Search .............................. 156/313, 307.3; 442/181; 523/435, 440

(56) References Cited

U.S. PATENT DOCUMENTS

| | | | | |
|---|---|---|---|---|
| 2,952,579 A | * | 9/1960 | Merriman ................... | 156/313 |
| 3,530,087 A | * | 9/1970 | Hayes et al. ................ | 523/435 |
| 3,607,518 A | * | 9/1971 | Ellinor ....................... | 156/313 |
| 4,567,216 A | | 1/1986 | Qureshi et al. | |
| 4,945,194 A | | 7/1990 | Ghali et al. | |
| 4,957,801 A | | 9/1990 | Maranci et al. | |
| 5,057,353 A | | 10/1991 | Maranci et al. | |
| 5,169,710 A | | 12/1992 | Qureshi et al. | |
| 5,248,711 A | | 9/1993 | Buyny et al. | |
| 5,368,922 A | * | 11/1994 | Portelli et al. ............. | 523/440 |
| 6,045,898 A | | 4/2000 | Kishi et al. | |

FOREIGN PATENT DOCUMENTS

| | | |
|---|---|---|
| EP | 0 274 899 | 7/1988 |
| EP | 0 632 087 A1 | 12/1993 |
| EP | 0 493 786 B1 | 8/1995 |
| EP | 0 819 723 A1 | 1/1998 |
| EP | 0 927 737 A1 | 7/1999 |
| JP | 7-53742 | 2/1995 |
| JP | 8-225666 | 9/1996 |
| JP | 11-43546 | 2/1999 |

* cited by examiner

Primary Examiner—John J. Gallagher
(74) Attorney, Agent, or Firm—Shapiro & Dupont LLP

(57) ABSTRACT

Resin compositions are provided which are used in combination with fibers to form self-adhesive prepreg sheets that are applied to core materials to form sandwich panels. The prepreg resin includes a thermoset resin, a curing agent and a viscosity control agent. The prepreg resin further includes certain thermoplastic particles which are used to control the flow characteristics of the prepreg resin and the formation of fillets during bonding of the prepreg to the core material.

32 Claims, 3 Drawing Sheets

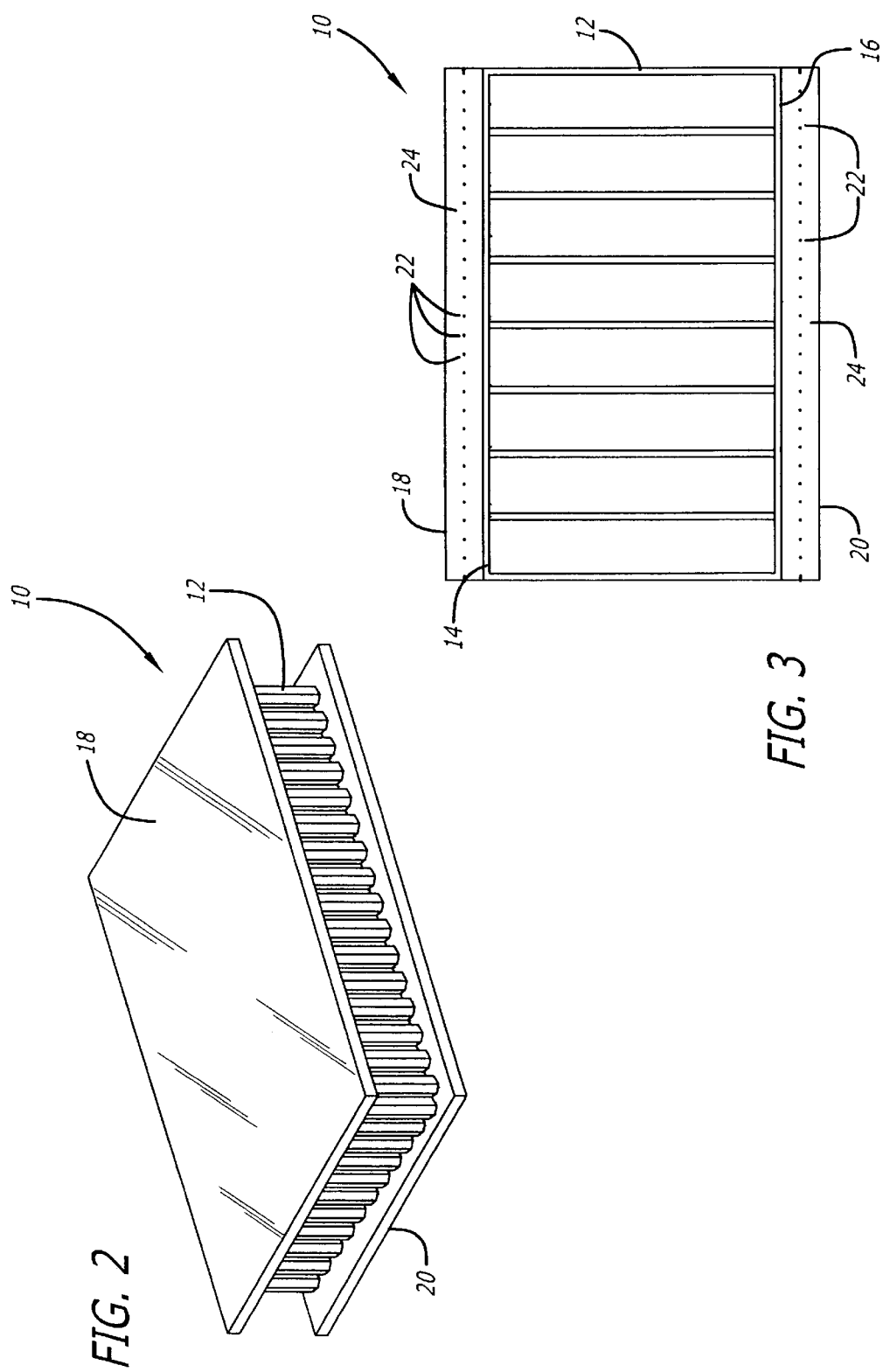

SELF-ADHESIVE PREPREG FACE SHEET FOR SANDWICH PANELS

This is a continuation-in-part application of copending application Ser. No. 09/573,760, filed May 18, 2000, now U.S. Pat. No. 6,440,257.

BACKGROUND OF THE INVENTION

1. Field of the Invention

The present invention relates generally to sandwich panels and other related structural composite materials. Sandwich panels are typically made up of face sheets which are adhesively bonded to opposite sides of a core material to form the sandwich panel. In particular, the present invention relates to sandwich panels in which the face sheets are self-adhesive so that a separate adhesive film is not required for bonding to the core.

2. Description of Related Art

Sandwich panels are used in a wide variety of applications where high strength and light weight are required. The cores which are used in most sandwich panels are either lightweight honeycomb, rigid foam, paper or wood. Honeycomb is a popular core material because of its high strength to weight ratio and resistance to fatigue failures. Honeycomb cores are made from a wide variety of products including metals and composite materials.

The face sheets which are bonded to each side of the sandwich core have also been made from a wide variety of materials which also include metals and composites. An important consideration in the formation of any sandwich panel is the adhesive which is used to bond the face sheets to the core. The adhesive must rigidly attach the facings to the core in order for loads to be transmitted from one facing to the other and to permit the structure to fulfill all the assumptions implied in the acceptance of the commonly used stress calculation methods. If the adhesive fails, the strength of the panel is severely compromised. The adhesive layer is especially critical in sandwich panels which use honeycomb cores because of the relatively small surface area over which the honeycomb edges contact the face sheets.

Honeycomb sandwich panels are used in many applications where stiffness and structural strength of the panel are primary considerations. Additionally, honeycomb sandwich panels are also widely used in the aerospace industry where the weight of the panel is also of primary importance. As a result, there has been and continues to be a concerted effort to reduce the weight of the honeycomb sandwich panels without sacrificing structural strength. One area which has been investigated to reduce weight is the elimination of separate adhesive layers. This has been accomplished by making the face sheets from composite materials which are self-adhesive. Exemplary self-adhesive face sheets are described in published European Patent Application Nos. EP0927737 A1 and EP0819723 A1.

One procedure for applying face sheets to honeycomb involves forming a prepreg sheet which includes at least one fabric or fiber layer and an uncured prepreg resin. Prepreg is a term of art used in the composite materials industry to identify mat, fabric, nonwoven material or roving which has been preimpregnated with resin and which is ready for final curing. An adhesive is typically applied to the prepreg and it is then bonded to the honeycomb by curing of both the prepreg resin and adhesive resin at elevated temperature.

In these instances where the prepreg is bonded without using a separate adhesive (i.e., the prepreg is self-adhesive), the prepreg resin must meet the dual requirements of being suitable for preimpregnating the fiber layer while still providing adequate adhesion to the honeycomb. There is a present and continuing need to identify and develop prepreg resins which are suitable for use in self-adhesive prepregs to provide lightweight yet structurally strong sandwich panels.

SUMMARY OF THE INVENTION

In accordance with the present invention, prepreg face sheets have been developed that are useful as self-adhesive face sheets which are bonded to honeycomb to form sandwich panels that are lightweight, structurally strong and exhibit many other desirable properties. Sandwich panels incorporating the self-adhesive prepregs of the present invention exhibit high peel strength, good hot/wet properties, low solvent absorption, high resistance to core crushing and other properties that are desirable for aerospace applications.

Self-adhesive prepregs in accordance with the present invention include at least one fiber layer that is impregnated with a prepreg resin to form a prepreg which has a prepreg resin layer having a bonding surface which is bonded directly to the honeycomb during sandwich panel formation. The prepreg resin includes a thermoset resin, a curing agent and a sufficient amount of a viscosity control agent to provide a prepreg resin having a viscosity which is sufficient to allow the prepreg resin to be combined with the fiber layer to form the prepreg resin layer. As a feature of the present invention, it was discovered that certain types and sizes of thermoplastic particles may be used as fillet forming particles that can be incorporated into the prepreg resin in amounts sufficient to make the prepreg self-adhesive while not adversely affecting the viscosity or other properties of the resin which are required for its use as a prepreg resin.

As a further feature of the present invention, it was found that thermoplastic fillet forming particles, such as densified polyethersulfone, are not dissolved to any substantial degree when they are loaded into the prepreg resin. As a result, the prepreg resin can be loaded with enough fillet forming particles to substantially increase the bonding strength of the resin while at the same time not increasing the viscosity of the prepreg resin to unacceptable levels. It was discovered that the fillet forming particles dissolve during the curing process to provide the resin with flow characteristics that enhance fillet formation between the prepreg and honeycomb. Fillet size and shape are known to be an important consideration in the bonding of face sheets to honeycomb. In addition, the dissolved fillet forming particles provide toughening of the resin which improved overall bond strength.

The present invention involves not only the uncured self-adhesive prepregs, but also includes the prepregs after they have been attached to honeycomb and cured to form finished sandwich panels. The invention also covers methods for bonding the self-adhesive prepregs to honeycomb in order to form sandwich panels. The methods involve forming a self-adhesive prepreg by providing at least one fiber layer and a prepreg resin wherein the prepreg resin is combined with the fiber layer to form a prepreg resin layer having a bonding surface which is adapted to be bonded directly to the side surface of the honeycomb. The prepreg resin includes a thermosetting resin, or a combination of thermosetting resins such as epoxy, cyanate ester, bismaleimide, and the like, curing agents and a sufficient amount of viscosity control agent so that the prepreg resin has a viscosity which is sufficient to allow the prepreg resin to be combined with the fiber layer to form the prepreg resin layer.

In accordance with the present invention, the step of forming a self-adhesive prepreg further includes the step of incorporating thermoplastic fillet forming particles into the prepreg resin in an amount sufficient to form a prepreg layer which is self-adhesive and wherein the fillet forming particles are not dissolved to any substantial degree in the prepreg resin. As a final step in the method, the self-adhesive prepreg is bonded to said honeycomb wherein the bonding involves curing the self-adhesive prepreg for a sufficient time and at a sufficient temperature to substantially dissolve the fillet forming particles.

The prepregs and finished sandwich panels made in accordance with the present invention may be used in a wide variety of situations where a light weight and structurally strong material is needed. However, the invention is especially well-suited for use in aerospace applications where a multitude of strict mechanical and chemical requirements must be met while at the same time not exceeding weight limitations. The above-described and many other features and attendant advantages of the present invention will become better understood by reference to the following detailed description when taken in conjunction with the accompanying drawings.

BRIEF DESCRIPTION OF THE DRAWINGS

FIG. 2 is a perspective view of an exemplary sandwich panel which has been formed by bonding together the honeycomb core and face sheets shown in FIG. 1

FIG. 3 is a side view of a portion of the sandwich panel shown in FIG. 2.

DETAILED DESCRIPTION OF THE INVENTION

Figure 1:
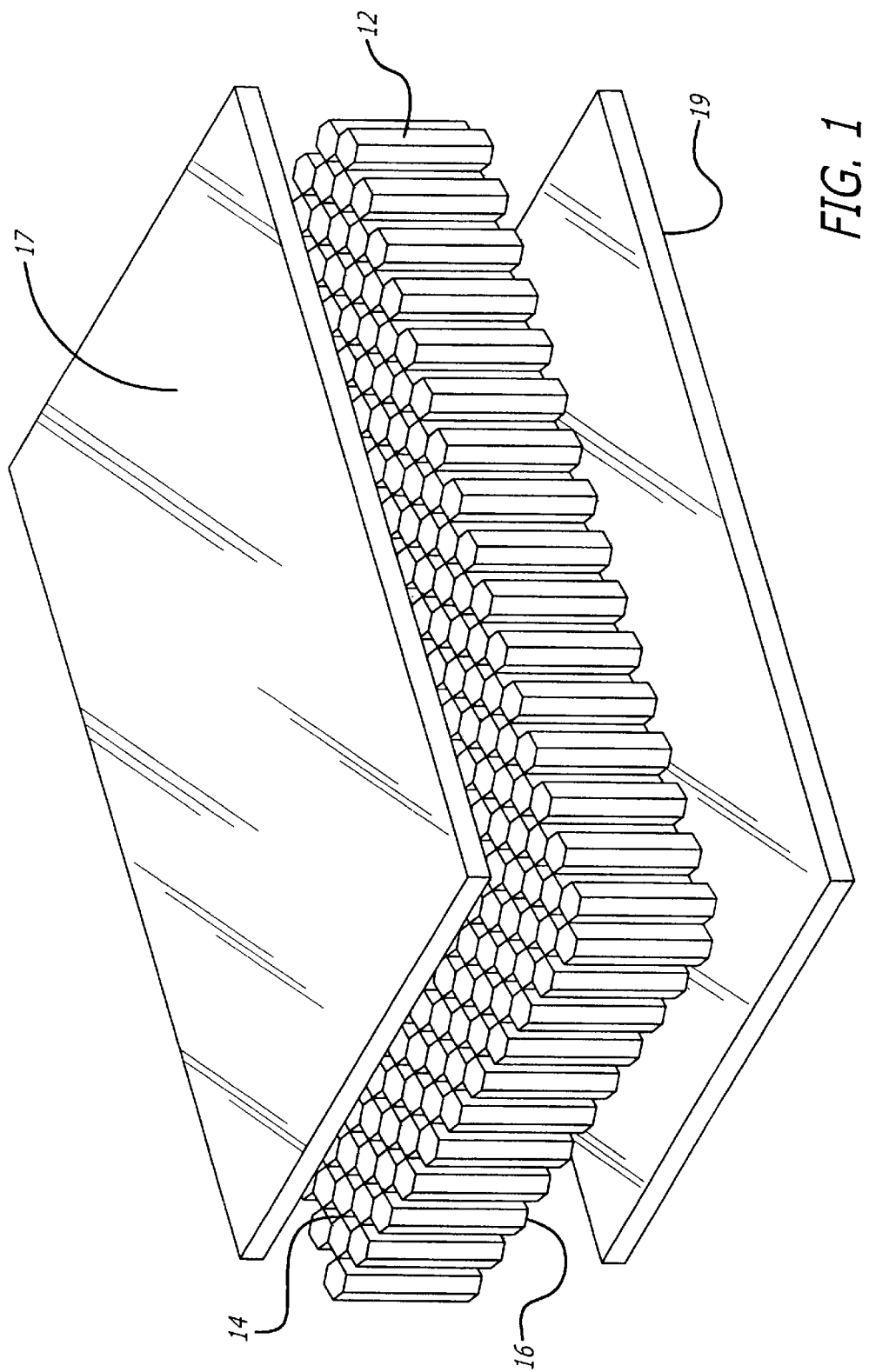
FIG. 1 is a perspective view of an exemplary honeycomb core and two self-adhesive face sheets prior to bonding together to form the sandwich panel.

The prepregs of the present invention are preferably used to form self-adhesive faces sheets which are attached to honeycomb cores to form light weight structural panels for use in aerospace applications. Referring to FIGS. 2 and 3, a honeycomb sandwich panel is shown generally at 10. The sandwich panel 10 includes a honeycomb core 12 which has firm and second sides 14 and 16, respectively. Uncured self-adhesive prepregs 17 and 19 (see FIG. 1) are applied to the core 12 and then cured to form face sheets 18 and 20 of the finished panel 10 (see FIG. 2). As shown in FIG. 3, the face sheets 18 and 20 are applied directly to the core 12 without a separate adhesive layer. Each of the face sheets 18 and 20 are made up of fibers 22 which are embedded in a prepreg resin matrix 24. In FIG. 1, the face sheets are shown as prepregs 17 and 19 prior to application to the honeycomb core 12.

The honeycomb core 12 can be made from any of the materials which are used to form honeycomb cores. Exemplary honeycomb materials include aluminum, aramide, carbon or glass fiber composite materials, resin impregnated papers and the like. A preferred honeycomb material is an aramid-based substrate, for example, NOMEX® which is available from E.I. DuPont de Nemours & Company (Wilmington, Del.). Although the dimensions of the honeycomb can be varied widely, it is preferred that the honeycomb core have ⅛ inch (0.31 cm) cells with the core being ½ inch (1.27 cm) thick. In so far as the present invention provides a "self-adhesive" prepreg, "self-adhesive" is self-defining in that the prepreg will form a suitable panel without the use of an adhesive layer. As will be discussed hereinafter, a peel test is a primary way of verifying that the resultant panel is suitable. "Self-adhesive" prepregs preferably yield a peel strength (under ASTM D 1781) of 20 in-lb/3 in width or higher, and more preferably yield a peel strength of 28 in-lb/3 in width or higher. However, peel strength specifics are dependent on the type and size of honeycomb used.

The fibers 22 which are used in the face sheets 18 and 20 can be any of the fiber materials which are used to form composite laminates. Exemplary fiber materials include glass, aramid, carbon, ceramic and hybrids thereof. The fibers may be woven, unidirectional or in the form of random fiber mat. Preferred fiber materials include 193 grams per square meter (gsm or $g/m^2$) plain weave carbon fabric with three thousand filament (3K) fibers which are commercially available.

The resins which are combined with the fiber layer to form prepregs in accordance with the present invention include epoxy and/or cyanate ester resins, curing agents, viscosity control agents and thermoplastic fillet forming particles. Epoxy or cyanate ester resins are first mixed with viscosity control agents to form a resin mixture. If necessary, the mixture is heated to ensure that viscosity control agents are completely dissolved. Curing agents and fillet forming particles are then added to the resin mixture. The final resin mixture is kept below the temperature at which the fillet forming particles dissolve in the resin. As a result, the fillet forming particles are not dissolved to a substantial degree in the prepreg resin and therefore do not increase the resin viscosity to an unacceptable level. The viscosity of the resin mixture is important because it must be such that the resin can be impregnated into the fiber to form the prepreg. For the purposes of this specification, particles which retain at least 90 weight percent of their original particle weight are considered to be not dissolved to a substantial degree. Particles are considered to be substantially dissolved when less than 10 percent by weight of the original particle remains intact within the resin.

The viscosity of the final resin mixture should be between 150 and 1500 poise. The preferred viscosity is between 400 to 1000 poise. The preceding viscosity ranges represent minimum viscosities for the final resin mixture wherein the thermoplastic fillet forming particles are not dissolved to a substantial degree. The viscosity of the resin mixture gradually increases when the fillet forming particles are allowed to dissolve during the bonding/curing process.

The fillet forming particles may be added to the prepreg resin before it is applied to the fiber layer to form the prepreg. In such cases the fillet forming particles are uniformly distributed throughout the prepreg resin matrix. Alternatively, the fillet forming particles may be applied (e.g., by spraying) to the surface of the prepreg resin after it has been formed into a prepreg file or after the resin has been impregnated into the fiber layer. In this way, the fillet forming particles are distributed substantially on the surface of the prepreg. In either case, the resin temperature is maintained at a sufficiently low level to prevent fillet forming particles from dissolving until the prepreg is applied to the core material and cured.

During the curing process, the prepreg is heated to a sufficient level to substantially dissolve the fillet forming particles. The dissolving of the particles during the curing process was found to control the flow of resin at the prepreg-core interface to promote fillet formation. In addition, the dissolved thermoplastic particles enhance the toughness of the bond. Fillet size and shape have long been known to be an important aspect of bond formation between honeycomb core and adhesively bonded face sheets.

Figure 4:
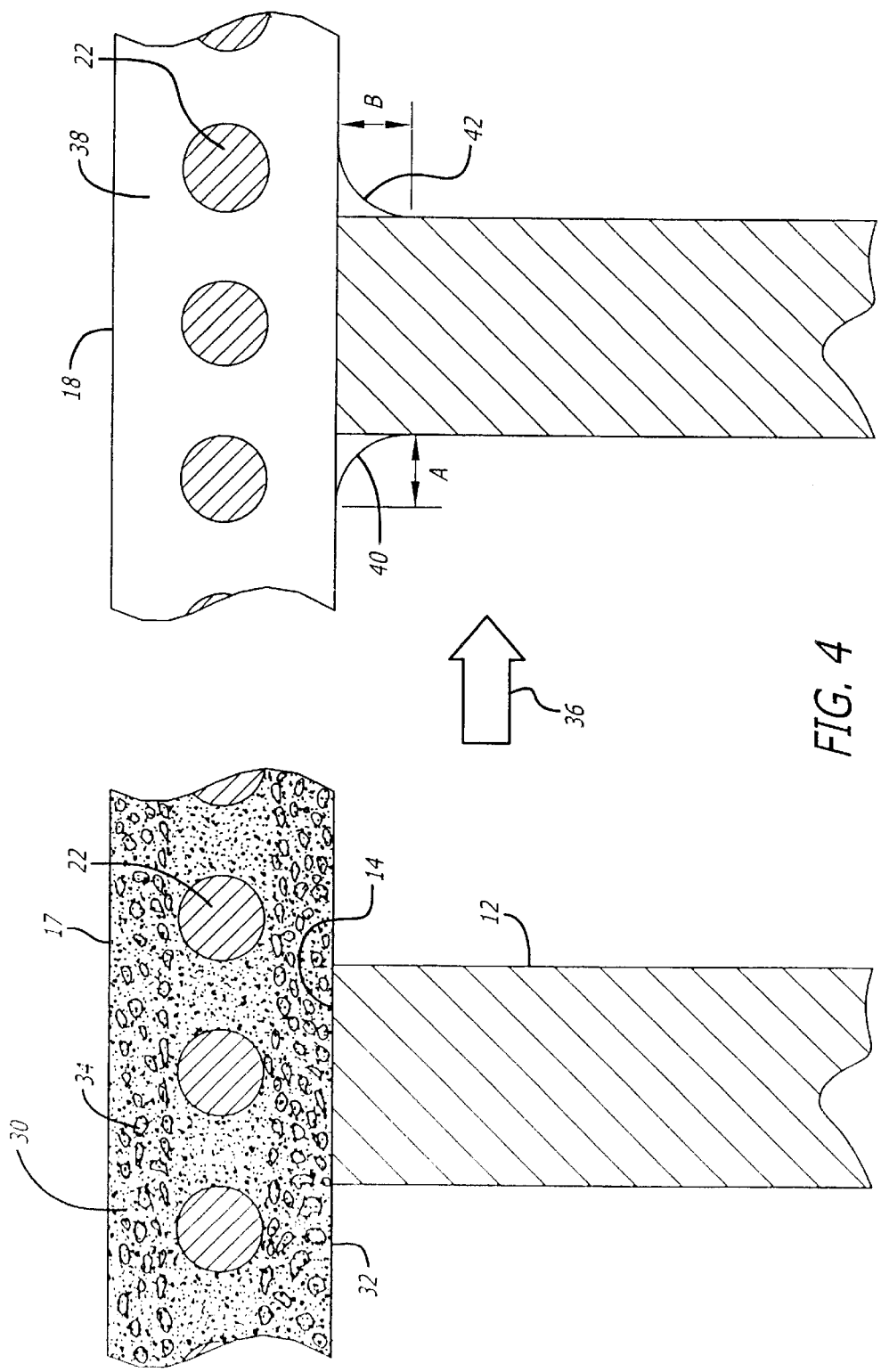
FIG. 4 is a side schematic view showing fillet formation and particle dissolution in accordance with the present invention.

Referring to FIG. 4, the uncured face sheet 17 is shown in position against the side surface 14 of one wall of the honeycomb 12. The prepreg 17 includes a fiber layer 22 which has been combined with the prepreg resin to form a prepreg resin layer 30 which includes a bonding surface 32 which is adapted to be bonded directly to the honeycomb 12 at the surface 14. The thermoplastic fillet forming particles 34 are shown being distributed preferentially on the outer faces of the face sheet 17. Other distributions of fillet forming particles 34 are possible, e.g., evenly throughout the face sheet 17, if desired, by selecting differently sized filled forming particles 34.

As represented by arrow 36, the prepreg 30 is cured at elevated temperature to form the single ply face sheet 18. As shown in FIG. 4, the cured face sheet 18 includes a cured prepreg resin matrix 38 in which the thermoplastic fillet forming particles are substantially dissolved. As the fillet forming particles 34 dissolve during the curing process, the viscosity of the prepreg resin increases so as to form fillets 40 and 42. The fillets 40 and 42 are preferably sized so that the "A" dimension (parallel to the prepreg face sheet) is approximately equal to the "B" dimension (perpendicular to the face sheet). Further, the length of dimensions A and B are preferably maximized as much as possible in order to achieve optimum bond strength for a given resin. As will be appreciated, resins having a viscosity which is too low during the curing process will produce fillets wherein the B dimension is relatively large and the A dimension is very small. Such fillet shapes do not provide good bonding. Alternatively, if the viscosity of the prepreg during curing is too high, the B dimension of the fillet is unacceptably small so that adequate bonding is not achieved. In accordance with the present invention, it was discovered that including the thermoplastic fillet forming particles in the prepreg resin matrix provides control of resin viscosity during the curing process, such that fillets were formed where dimensions A and B were equivalent and sufficiently large to provide good bonding. Although not wishing to be bound by any theory, it is believed that the gradual dissolving of the fillet forming particles during the curing process provides a gradual increase in resin viscosity which enhances fillet formation. The gradually dissolving thermoplastic particles control the flow of the resin at the honeycomb surface 14 so that fillets of the type shown in FIG. 4 at 40 and 42 are formed.

Exemplary thermosetting resins which may be used to make the prepreg resin include epoxy, cyanate ester and bismaleimide resins. Exemplary epoxy and cyanate ester resins include glycidylamine type epoxy resins, such as triglycidyl-p-aminophenol, tetraglycidyldiaminodiphenylmethane; glycidyl ether type epoxy resins, such as bisphenol A type epoxy resins, bisphenol F type epoxy resins, bisphenol S type epoxy resins, phenol novolak type epoxy resins, cresol novolak type epoxy resins and resorcinol type epoxy resins; cyanate esters, such as 1,1'-bis(4-cyanatophenyl) ethane (AroCy L-10, available from Vantico, Inc., Brewster, N.Y.), 1,3-Bis (4-cyanateophenyl-1-1-(1-methylethylidene) benzene (RTX366, available from Vantico, Inc., Brewster, N.Y.). Epoxy resins are preferred. Especially preferred epoxy blends include a mixture of trifunctional epoxy and a difunctional bis-F epoxy.

Curing agents and viscosity control agents are also added to the thermosetting resin to form the basic prepreg resin. The curing agent is preferably an amine curing agent and the viscosity control agent is preferably a thermoplastic material which dissolves in the thermosetting resin.

Although the present invention contemplates the use of thermoplastic fillet forming particles in a wide variety of prepreg resins to enhance formation of fillets between the face sheets and honeycomb core, prepreg resins based on epoxy and cyanate ester formulations are preferred. The following examples and description will be limited to epoxy formulations with it being understood that the bonding between other prepreg face sheets and honeycomb core may be improved by incorporating the thermoplastic fillet forming particles of the present invention into the prepreg face sheet. In addition, this description will be limited to a discussion of two ply face sheets wherein two fiber layers are present in the prepreg. The two layers are preferably either two (0/90) plies or two (±45, 0/90) plies with warp direction aligned with the lengthwise direction of the honeycomb. Those of ordinary skill in the art will recognize that the present invention is also applicable to multiple ply face sheets which include two or more fiber layers.

Exemplary prepreg resin formulations are as follows:
1 to 70 parts by weight of an epoxy;
5 to 40 parts by weight of an aromatic amine curing agent;
1 to 30 parts by weight of a viscosity control agent; and
5 to 50 parts by weight of thermoplastic fillet forming particles.

The epoxy may be composed of trifunctional epoxy, difunctional epoxy and a wide variety of combinations of trifunctional and difunctional epoxies. Exemplary trifunctional epoxy include triglycidyl p-aminophenol, N,N-Diglycycyl-4-glycidylppxyaniline (MY-0510 or MY-500 available from Ciba-Geigy) and tetraglycidyl diaminodiphenyl methane (MY-721, MY-720 and MY-9512 available from Ciba-Geigy). Exemplary difunctional epoxies which may be used in the resin include Bis-F epoxies, such as GY-281, LY-9703 and GY-285 which are available from Vantico, Inc., Brewster, N.Y.). Bis-A epoxies, such as GY-6010 (Vantico, Inc., Brewster, N.Y.) and Der 331 (Dow Chemical, Midland, Mich.) are suitable Bisphenol-S type epoxies and may also be used. Other suitable epoxies include phenol novolak type epoxy, cresol novolak epoxy and resorcinol type epoxy. Preferred bis-F epoxies include GY281 which is available from Vantico, Inc., Brewster, N.Y.

Exemplary aromatic amine curative agents include 3,3-diaminodiphenylsulfone (3,3-DDS), amino or glycidylsilanes such as 3-amino propyltriethoxysilane, CuAcAc/Nonylphenol (1/0.1), 4,4'-diaminodiphenylsulfone (4,4'-DDS), 4,4'-methylenebis(2-isopropyl-6-methylaniline), e.g., Lonzacure M-MIPA (Lonza Corporation, Fair Lawn, N.J.), 4,4'-methylenebis(2,6-diisopropylaniline), e.g., Lonzacure M-DIPA (Lonza Corp., Fair Lawn, N.J.). 3,3-DDS is a preferred amine curative agent.

Exemplary viscosity control agents include thermoplastic polyetherimides such as ULTEM 1000p which is available from General Electric (Pittsfield, Mass.); polyethersulfones such as 5003p, which is available from Sumitomo Chemical Co., Ltd. (Osaka, Japan); HRI-1, which is available from Hexcel Corp. (Dublin, Calif.); and polyimide matrimide 9725, which is available from Vantico, Inc. (Brewster, N.Y.). ULTEM 1000p is a preferred polyetherimide. The amount and type of viscosity control agent which is added to the epoxy resin mixture may be varied provided that the minimum viscosity of the final resin mixture is maintained between 100 and 1500 poise. As previously mentioned, mixtures with minimum viscosities of between 400 to 1000 poise are preferred. The viscosity of the prepreg resin prior to addition of the fillet forming particles should be between about 1 poise and 100 poise. The preferred viscosity range is 5 poise to 50 poise.

Densified polyethersulfone (PES) and densified polyetherimide particles may be used as suitable fillet forming particles. Densified PES particles are preferred. The densified polyethersulfone (PES) particles are preferably made in accordance with the teachings of U.S. Pat. No. 4,945,154, the contents of which is hereby incorporated by reference. The average particle size of the PES particles range from 1 to 150 microns. Average particle sizes of 1 to 50 microns are preferred and average particle sizes of 10 to 25 microns are particularly preferred. The microspheres are generally spherical in shape and are classified by passing the densified microsphere powder through a micron sieve. It is preferred that the glass transition temperature (Tg) for the particles be above 200° C.

In an alternative embodiment, the PES is "micronized." Micronized PES refers to PES particles which have a rough surface configuration which is produced by grinding the particles or other abrasive techniques of manufacture which are known in the art. Micronized PES particles may also be made by spraying and drying procedures which are also known in the art. Micronized PES particles are preferably less than 120 microns in size. Especially preferred are particles under 50 microns in size with a range of 10 to 25 microns being particularly preferred.

The prepreg resin is made by first mixing the epoxy components together and then slowly adding the polyetherimide. The resulting mixture is heated to around 130° C. and mixed for a sufficient time to dissolve the polyetherimide. Once the polyetherimide is dissolved, the mixture is cooled to around 75° C. The aromatic amine curing agent and densified PES particles are then added to the mixture. The resin should be kept at temperatures below about 70° C.–75° C. while the curative agent and densified PES particles are being mixed into the resin. The final resin has a viscosity of between 100 to 1500 poise. The preferred viscosity range is 400 to 1000 poise. The viscosity is measured at conditions of 2° C./min, 10 rads/sec and 0.8 mm gap with Rheometric Dynamic Analysis (Rheometrics RDA2).

The finished resin is applied to the desired fabric to form a prepreg. The resin content of the prepreg may be varied depending upon a number of different parameters in order to achieve desired mechanical and structural properties for the sandwich panel. It is preferred that the prepreg have a resin content of 35–45 weight percent.

The prepreg is applied to the sides of the honeycomb core using a vacuum and heat to cure the prepreg and form side sheets which are securely bonded to the honeycomb. The amount of vacuum and heat used to cure and bond the prepreg to the honeycomb may be varied depending upon the particular resin formulation and the amount of resin in the prepreg. In general, sufficient pressure must be applied to the prepreg to ensure that the resin flows into the honeycomb cells a sufficient amount to provide adequate fillet formation and bonding.

The temperature and other curing conditions are selected such that the densified PES particles are substantially dissolved during the curing process. It has also been found that panels made with the inventive self-adhesive provide excellent resistance to core crush. For example, panels of the type set forth in Examples 1 and 2 exhibit essentially 0% core crush. Other conventional aviation panels utilizing 3K carbon fabric prepregs in accordance with the present invention will also show improved resistance to core crushing. Even panels made utilizing twelve thousand filament (12K) carbon fabric prepreg in accordance with the present invention will produce panels which exhibit only 5% core crush.

Examples of practice are as follows:

EXAMPLE 1

Resin was prepared having the following formulation:

23 weight percent MY-0510 (N,N-Diglycydyl-4-glycidylpxyaniline)

25 weight percent GY281 (bis-F epoxy)

19 weight percent 3,3-Diaminodiphenylsulfone (3,3-DDS)

7 weight percent ULTEM 1000p (polyetherimide)

26 weight percent densified PES

The densified PES was made from PES 5003P which is available from Sumitomo Chemical Co. Ltd. (Osaka, Japan). The PES was densified in accordance with U.S. Pat. No. 4,945,154. MY0510 and GY281 were first mixed in a mixing vessel, heated to 70° C. for approximately 10 minutes. The ULTEM 1000p particles were then added and the resulting mixture heated to 130° C. with mixing for approximately 75 minutes to fully dissolve the ULTEM1000p particles. The mixture was then cooled to 75° C. and the 3,3-DDS was mixed in for about 15 minutes. Then, the densified PES was slowly added and mixed in for approximately 10 minutes to provide the final resin mixture. The final resins had minimum viscosities of about 900 poise. Panels were prepared by first forming a prepreg of 193 gsm 3K PW AMOCO fabric containing 69 grams of resin square per meter. The prepreg was formed as follows:

The resin was coated on release paper by reverse roller at about 175° F. (79° C.) to form a film containing 69 g/m². The resin film was impregnated into the carbon fiber with an areal weight of 193 g/m².

The prepreg was applied to HRH® 10 core having ⅛ inch (0.31 cm) cells and being ½ inch (1.27 cm) thick under vacuum at 22 inches (56 cm) Hg and cured for 2 hours at 177° C. with a pressure of 45 psi, venting at 20 psi and ramp cooling at a rate of 2° C. per minute.

The resulting specimens were subjected to peel test according to ASTM D 1781. The face sheets all had peel strengths above 29 in-lb/3 in width. The dimensions A and B for representative fillets were measured and found to be approximately of equal length.

EXAMPLE 2

Resin was prepared in the same manner as Example 1 except that the ingredients used to make the resin were as follows:

21 parts by weight MY-0510

21 parts by weight AcroCy110

21 parts by weight GY281

9 parts by weight ULTEM 1000p 1.5 parts by weight CuAcAc/Nonylphenol (1/0.1)

26.5 parts by weight densified PES

The final resin mixture was used to form a prepreg and applied to HRH® 10 core in the same manner as Example 1. The minimum viscosity of the final resin mixture was about 500 poise. The peel strength of the resulting face sheet was 26 in-lb/3 in width.

Comparative Example 1

Resin was prepared as follows:

Add 12.5 parts MY-0510 and 37.5 parts GY281 to a mixing vessel and heat to 70° C. for about 10 minutes. Then add 7 parts ULTEM 1000p and heat the mixture to 130° C. Mix for about 75 minutes to fully dissolve the ULTEM 1000p. Cool the mixture to a temperature of 75° C. and slowly add 19 parts 3,3'-DDS. Mix 15 minutes at 75° C. Finally, slowly add 26 parts densified PES and mix the resulting final mixture for approximately 10 minutes at 75° C.

Prepregs and sandwich panels were prepared in the same manner as in the preceding example. The resin had a viscosity of 118 poise. The peel strengths for the resulting face sheets were 22 in-lb/3 in width. The viscosity of the resin is believed to be responsible for the relatively low peel strength (i.e., below 25 in-lb/3 in width).

Comparative Example 2

Resin was prepared following the same procedure as set forth in Comparative Example 1 except that the ingredient amounts were as follows:

23 parts by weight MY-0510
25 parts by weight GY281
19 parts by weight 3,3-DDS
4.5 parts by weight ULTEM 1000p
26 parts by weight densified PES Prepregs and sandwich panels were prepared in the same manner as the preceding examples. The resin had a minimum viscosity of 123 poise. The peel strength for the resulting face sheets was 20 in-lb/3 in width.

Comparative Example 3

Resin was prepared following the same procedure as set forth in the preceding Comparative Examples except that the ingredient amounts were as follows:

50 parts by weight MY-0510
50 parts by weight GY281
47.6 parts by weight 3,3-DDS
0.0 parts by weight ULTEM 1000p
30 parts by weight non-densified PES Prepregs and sandwich panels were prepared in accordance with the preceding examples. The resin had a minimum viscosity of about 30 poise. The peel strength was 13 in-lb/3 in width.

Comparative Example 4

Resin was prepared following the same procedure as the previously described Comparative Examples except that the ingredients were as follows:

13.6 parts by weight MY721
11.8 parts by weight MY-0510
25 parts by weight GY281
5 parts by weight Matrimide 9725
20 parts by weight 3,3-DDS
25 parts by weight densified PES The viscosity of this resin was 3187 poise. The resulting prepreg had low tack and poor draping properties because the viscosity was too high.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above preferred embodiments, but is only limited by the following claims.

What is claimed is:

1. A self-adhesive prepreg for bonding to a side surface of a honeycomb, said self-adhesive prepreg comprising:
   at least one fiber layer;
   a prepreg resin which has been combined with said fiber layer to form said self-adhesive prepreg comprising a bonding surface which is adapted to be bonded directly to said honeycomb, said prepreg resin comprising a thermosetting resin, a curing agent, a thermoplastic viscosity control agent which is substantially dissolved in said thermosetting resin; and
   thermoplastic fillet forming particles that are selected from the group consisting of densified and micronized thermoplastic particles which have a glass transition temperature that is above 200° C., wherein said thermoplastic fillet forming particles are not dissolved to a substantial degree in said prepreg resin and wherein the amounts of said resin dissolved thermoplastic viscosity control agent and said thermoplastic fillet forming particles are such that the minimum viscosity of said prepreg resin during curing thereof is between 150–1500 poise.

2. A self-adhesive prepreg according to claim 1 wherein said thermosetting resin is selected from the group consisting of epoxy, bismaleimide and cyanate ester resins.

3. A self-adhesive prepreg according to claim 1 wherein said thermoplastic fillet forming particles are selected from the group consisting of densified polyether sulfone, micronized polyether sulfone and densified polyetherimide.

4. A self-adhesive prepreg according to claim 1 wherein said prepreg thermoplastic fillet forming particles have particles ranging from 1 to 150 microns.

5. A self-adhesive prepreg according to claim 1 wherein said prepreg resin comprises an epoxy thermosetting resin, a polyetherimide viscosity control agent and micronized polyether sulfone fillet forming particles.

6. A self-adhesive prepreg according to claim 1 wherein the viscosity of said prepreg after said fillet forming particles are incorporated therein is between 400 to 1000 poise.

7. A self-adhesive prepreg according to claim 1 wherein said thermoplastic fillet forming particles are distributed uniformly within said prepreg resin.

8. A self-adhesive prepreg according to claim 1 wherein said thermoplastic fillet forming particles are located substantially at said bonding surface of said prepreg resin layer.

9. A honeycomb comprising a core having at least one side surface to which a self-adhesive prepreg made according to claim I is bonded and wherein said self-adhesive prepreg has been cured so that said thermoplastic fillet forming particles are substantially dissolved in said prepreg resin.

10. A honeycomb comprising a core having at least one side surface to which a self-adhesive prepreg made according to claim 3 is bonded and wherein said self-adhesive prepreg has been cured so that said thermoplastic fillet forming particles are substantially dissolved in said prepreg resin.

11. A honeycomb comprising a core having at least one side surface to which a self-adhesive prepreg made according to claim 4 is bonded and wherein said self-adhesive prepreg has been cured so that said thermoplastic fillet forming particles are substantially dissolved in said prepreg resin.

12. A honeycomb comprising a core having at least one side surface to which a self-adhesive prepreg made according to claim 5 is bonded and wherein said self-adhesive prepreg has been cured so that said thermoplastic fillet forming particles are substantially dissolved in said prepreg resin.

13. A honeycomb comprising a core having at least one side surface to which a self-adhesive prepreg made according to claim 2 is bonded and wherein said self-adhesive prepreg has been cured so that said thermoplastic fillet forming particles are substantially dissolved in said prepreg resin.

14. A honeycomb comprising a core having at least one side surface to which a self-adhesive prepreg made according to claim 6 is bonded and wherein said self-adhesive prepreg has been cured so that said thermoplastic fillet forming particles are substantially dissolved in said prepreg resin.

15. A honeycomb comprising a core having at least one side surface to which a self-adhesive prepreg made according to claim 7 is bonded and wherein said self-adhesive prepreg has been cured so that said thermoplastic fillet forming particles are substantially dissolved in said prepreg resin.

16. A honeycomb comprising a core having at least one side surface to which a self-adhesive prepreg made according to claim 8 is bonded and wherein said self-adhesive prepreg has been cured so that said thermoplastic fillet forming particles are substantially dissolved in said prepreg resin.

17. A self-adhesive prepreg according to claim 1 wherein said viscosity control agent is selected from the group consisting of thermoplastic polyetherimides and micronized polyethersulfone.

18. A self-adhesive prepreg according to claim 2 wherein said epoxy resin comprises difunctional epoxy resin, trifunctional epoxy resin or a combination of difunctional and trifunctional epoxy resins.

19. A self-adhesive prepreg according to claim 4 wherein said thermoplastic fillet forming particles have particle sizes ranging from 10 to 25 microns.

20. A method for adhesively bonding a prepreg face sheet to a honeycomb comprising the steps of:

forming a self-adhesive prepreg comprising providing at least one fiber layer and a prepreg resin wherein said prepreg resin is combined with said fiber layer to form said self-adhesive prepreg comprising a bonding surface which is adapted to be bonded directly to said honeycomb, said prepreg resin comprising a thermosetting resin, a curing agent, a thermoplastic viscosity control agent which is substantially dissolved in said thermoset resin and thermoplastic fillet forming particles that are selected from the group consisting of densified and micronized thermoplastic particles which have a glass transition temperature that is above 200° C., wherein said thermoplastic fillet forming particles are not dissolved to a substantial degree in said prepreg resin;

bonding said self-adhesive prepreg to said honeycomb wherein said bonding comprises curing said self-adhesive prepreg for a sufficient time and at a sufficient temperature to substantially dissolve said fillet forming particles and wherein the amounts of said resin dissolved thermoplastic viscosity control agent and said thermoplastic fillet forming particles are such that the minimum viscosity of said prepreg resin during curing thereof is between 150–1500 poise.

21. A method according to claim 20 wherein said thermosetting resin is selected from the group consisting of epoxy, bismaleimide and cyanate ester resins.

22. A method according to claim 20 wherein said thermoplastic fillet forming particles are selected from the group consisting of densified polyether sulfone, micronized polyether sulfone and densified polyetherimide.

23. A method according to claim 20 wherein said thermoplastic fillet forming particle sizes ranging from 1 to 150 microns.

24. A method according to claim 20 wherein said prepreg resin comprises an epoxy thermosetting resin, a polyetherimide viscosity control agent and micronized polyether sulfone fillet forming particles.

25. A method according to claim 20 wherein said thermoplastic fillet forming particles are distributed uniformly within said prepreg resin.

26. A method according to claim 20 wherein said thermoplastic fillet forming particles are located substantially at said bonding surface of said prepreg resin.

27. A honeycomb comprising a core having at least one side surface to which a self-adhesive prepreg made according to claim I is bonded and wherein said self-adhesive prepreg has been cured so that said thermoplastic fillet forming particles are substantially dissolved in said prepreg resin and wherein said honeycomb exhibits a core crush of less than 5%.

28. A honeycomb according to claim 27 wherein said fabric layer comprises three thousand filament carbon fabric or twelve thousand filament carbon fabric.

29. A honeycomb according to claim 28 wherein said fabric layer comprises three thousand filament carbon fabric and said honeycomb exhibits a core crush which is essentially 0%.

30. A method according to claim 20 wherein said viscosity control agent is selected from the group consisting of thermoplastic polyetherimides and micronized polyethersulfone.

31. A method according to claim 21 wherein said epoxy resins comprises difunctional epoxy resin, trifunctional epoxy resin or a combination of difunctional and trifunctional epoxy resins.

32. A method according to claim 23 wherein said thermoplastic fillet forming particles have particle sizes ranging from 10 to 25 microns.

* * * * *